Patented Nov. 16, 1926.

1,607,453

UNITED STATES PATENT OFFICE.

HERMANN GAMMAY, OF STUTTGART, GERMANY.

PROCESS FOR THE PRODUCTION OF CAMPHOR FROM ISOBORNEOL.

No Drawing.　　　Application filed January 28, 1926. Serial No. 84,512.

This invention relates to a process for the production of camphor from isoborneol.

It is known to produce camphor from isoborneol by means of chromic acid. According to the known processes the entire amount of chromic acid required for the oxidation of a batch of isoborneol is added, all at once, in form of a very dilute solution, to the reaction mixture. A great disadvantage of this procedure is that, due to the fact that the chromic acid is present at the beginning of the reaction in large excess, the camphor first formed is further oxidized and the yield and quality of the camphor product are thus unfavorably influenced to a very substantial extent. Another disadvantage is that, due to the great dilution of the reaction mixture, large reaction vessels are required.

According to the present invention camphor is obtained in almost quantitative yields and of an excellent quality from isoborneol if to the isoborneol in subdivided form mixed with water, chromic acid solution is carefully added while stirring until the melting point of camphor is reached. The reaction at first proceeds very slowly for which reason a few percent of a non-oxidizable solvent preferably are added at the beginning. As soon as oxidation commences the reaction mixture becomes warm. The addition of chromic acid solution is continued until the highest temperature admissible for the oxidation is attained. Thereupon the supply is shut off and the reaction mixture is cooled. After this cooling has been effected chromic acid solution is added again. This procedure is repeated until a sample exhibits the required melting point.

The oxidation may also be carried out by mixing the isoborneol with a solution of sulfuric acid or adding sulfuric acid to a mixture of isoborneol and water, the quantity of sulfuric acid in either case being sufficient to liberate from bichromate the quantity of chromic acid required for the oxidation of the isoborneol and thereupon gradually introducing bichromate solution into the mixture of sulfuric acid, water and isoborneol in the same manner as the chromic acid solution is introduced into the mixture of water and isoborneol as described above.

A special advantage of the process, which resembles titration, undoubtedly lies in the fact that the chromic acid is always applied in a very dilute state and is never present in large excess.

Example.

1500 kgs. isoborneol are stirred up with 2000–3000 kgs. water and about 50 kgs. benzole or its homologues or benzine are added. Thereupon a solution of 1000 kgs. sodium bichromate in admixture with 1350 kgs. sulphuric acid of 66° Bé. and 2700 kgs. water are gradually introduced in the above-described manner, for a period of from 6 to 8 hours.

What I claim is:

1. Process for the production of camphor by the oxidation of isoborneol by means of chromic acid which comprises gradually applying chromic acid to a mixture of isoborneol in subdivided form and water while agitating the mixture, the rate of application of the chromic acid being not substantially greater than the rate at which the chromic acid is consumed by the oxidation reaction.

2. Process for the production of camphor as defined in claim 1 in which the chromic acid is applied to an initially cold mixture of isoborneol and water and the application of chromic acid and agitation are continued until the temperature of the mixture reaches the melting point of camphor.

3. Process for the production of camphor as defined in claim 1 in which the mixture of isoborneol and water contains a relatively small proportion of a non-oxidizable solvent of isoborneol.

4. Process for the production of camphor as defined in claim 1 in which the mixture of isoborneol and water contains sulfuric acid in quantity sufficient to liberate the quantity of chromic acid required for the oxidation from bichromate and bichromate solution is slowly added to the mixture during the agitation.

In testimony whereof I affix my signature.

HERMANN GAMMAY.